(12) United States Patent
Liu et al.

(10) Patent No.: US 8,743,957 B2
(45) Date of Patent: Jun. 3, 2014

(54) CONTEXT ADAPTIVE DIRECTIONAL INTRA PREDICTION

(75) Inventors: Wei Liu, San Jose, CA (US); Ehsan Maani, San Jose, CA (US); Mohammad Gharavi-Alkhansari, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 13/079,929

(22) Filed: Apr. 5, 2011

(65) Prior Publication Data

US 2011/0249739 A1    Oct. 13, 2011

Related U.S. Application Data

(60) Provisional application No. 61/323,063, filed on Apr. 12, 2010.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *G06K 9/46* | (2006.01) |

(52) U.S. Cl.
USPC ............ 375/240.12; 375/240.02; 375/240.03; 382/238; 382/239

(58) Field of Classification Search
None
See application file for complete search history.

(56) References Cited

U.S. PATENT DOCUMENTS

| | | | |
|---|---|---|---|
| 5,805,742 A | 9/1998 | Whitsitt | |
| 7,088,392 B2* | 8/2006 | Kakarala et al. | 348/272 |
| 7,203,234 B1* | 4/2007 | Zeng | 375/240.03 |
| 7,379,499 B2 | 5/2008 | Dahlhoff et al. | |
| 8,081,256 B2* | 12/2011 | Lertrattanapanich et al. | 348/448 |
| 8,237,868 B2* | 8/2012 | Takeda et al. | 348/701 |
| 2003/0223645 A1* | 12/2003 | Sun et al. | 382/239 |
| 2006/0039590 A1* | 2/2006 | Lachine et al. | 382/128 |
| 2006/0120590 A1* | 6/2006 | Han et al. | 382/154 |
| 2007/0014482 A1* | 1/2007 | Kim et al. | 382/254 |

(Continued)

FOREIGN PATENT DOCUMENTS

| | | |
|---|---|---|
| EP | 0687104 B1 | 8/1998 |
| EP | 2166769 A1 | 3/2010 |

OTHER PUBLICATIONS

ISA/US, international search report and written opinion issued on May 25, 2011, with claims, from related PCT Application No. PCT/US2006/028915, claiming priority to U.S. Appl. No. 61/323,063, filed Apr. 12, 2010, pp. 1-46.

(Continued)

*Primary Examiner* — Joseph Ustaris
*Assistant Examiner* — Rebecca Volentine
(74) *Attorney, Agent, or Firm* — John P. O'Banion (57) ABSTRACT

Enhanced directional prediction apparatus and methods are taught which are based on edge-based adaptive directional estimation, for providing an improved prediction direction for intra prediction within a coding device. Image gradient vectors are obtained for pixels in the neighborhood of the current block, and edge directions determined. Candidate edge directions are processed to derive a dominant edge direction in response to defining an objective function as a summation of projections to a candidate direction and computing suggested direction of each neighboring pixel. The dominant edge direction may be utilized for the prediction direction, such as in response to a detection mode flag signaled to the decoder, or modified by an angular adjustment, which can be communicated to a decoder.

37 Claims, 6 Drawing Sheets

(56) References Cited

U.S. PATENT DOCUMENTS

| | | |
|---|---|---|
| 2007/0053443 A1 | 3/2007 | Song et al. |
| 2007/0147699 A1* | 6/2007 | Loce et al. .................... 382/266 |
| 2007/0172150 A1* | 7/2007 | Quan et al. .................... 382/298 |
| 2008/0107177 A1 | 5/2008 | Han et al. |
| 2008/0231746 A1 | 9/2008 | Lertattanapanich et al. |
| 2008/0232463 A1 | 9/2008 | Lu et al. |
| 2009/0110069 A1 | 4/2009 | Jung et al. |
| 2009/0190659 A1 | 7/2009 | Lee et al. |
| 2009/0225834 A1* | 9/2009 | Song et al. ............... 375/240.12 |
| 2009/0225842 A1 | 9/2009 | Cheon et al. |
| 2010/0027905 A1 | 2/2010 | Zhang et al. |
| 2010/0054595 A1* | 3/2010 | Demandolx et al. .......... 382/170 |
| 2010/0128995 A1* | 5/2010 | Drugeon et al. .............. 382/238 |

OTHER PUBLICATIONS

Kim, C. et al.—"Fast Intra Prediction in the Transform Domain"—DCC 2009—Data Compression Conf., Mar. 16-18, 2009, Snowbird, Utah, pp. 1-10.

Jafari, M. et al.—"Fast Intra- and Inter-Prediction Mode Decision in H.264 Advanced Video Coding"—10th IEEE Singapore Int. Conf. on Communication Systems, Oct. 2006, pp. 1-6.

\* cited by examiner

CONTEXT ADAPTIVE DIRECTIONAL INTRA PREDICTION

CROSS-REFERENCE TO RELATED APPLICATIONS

This application claims priority from U.S. provisional application Ser. No. 61/323,063 filed on Apr. 12, 2010, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video coding intra prediction, and more particularly to context adaptive directional intra prediction.

2. Description of Related Art

The efficient storage and communication of images and videos require advanced coding mechanisms for reducing spatial and/or temporal redundancies. Numerous encoding techniques are directed toward fulfilling that goal and continuous efforts are being made toward increased encoder and/or decoder (CODEC) efficiencies.

Providing efficient image and video decoding requires that the decoder be able to 'reverse' the encoding process performed by the encoder. However, a tradeoff must be made between more efficient coding at the encoder and the need for communicating additional information to the decoder so that it may properly decode the video encoded by the encoder.

The ability to exploit spatial redundancy between samples within a frame (e.g., frame, image, slice, group of macroblocks) is referred to as intra prediction. The advanced video coding standard (AVC) (i.e., H.264) supports intra prediction, including adaptive block sizes of 4×4 and 8×8 blocks. AVC is currently one of the most commonly used formats for the recording, compression, and distribution of high definition video.

In the current AVC intra coding framework, intra prediction is performed to remove correlation between pixels in the current block and reconstructed neighbors. AVC provides a DC prediction mode and eight directional prediction modes. The prediction mode number is signaled to the decoder using predictive coding.

Intra prediction techniques, such as utilized within AVC, suffer from accuracy limitations which limit perceived visual quality for a given level of compression (e.g., bit budget).

Accordingly, the present invention overcomes a number of shortcomings of existing intra-prediction techniques, toward improving accuracy while retaining high coding efficiencies.

BRIEF SUMMARY OF THE INVENTION

An apparatus and method are described for performing intra prediction with enhanced directional features within a context adaptive coding system. The invention is applicable to the AVC coding standard and to similar coding approaches which perform intra prediction.

It has been observed by the Applicants that current intra prediction techniques suffer from two major disadvantages. First, the limited number of directional modes, such as a maximum of eight within AVC, can limit the precision necessary to properly code blocks subject to arbitrary directional patterns. Secondly, mode number prediction from neighboring blocks is not sufficiently accurate to exploit the geometric dependency between blocks, which would allow use of enhanced directional modes in a decoder without significantly increasing side information.

The present invention is directed at addressing the above intra prediction issues by extending direction prediction to improve the visual quality as well the coding performance for next generation video coding standards. Extended directional information is provided while leveraging inter-block geometric dependency at the decoder side to limit the need for additional side information. In particular, enhanced prediction direction detection is performed at the decoder-side in the reconstructed neighborhood of the current block to get the a priori prediction direction.

The encoder according to the invention can perform intra prediction encoding using any desired number of modes, such as beyond the nine modes provided in the AVC coding standard. The encoder can derive a prediction direction, which can be adjusted by the encoder to account for curvatures. Additional side information can be sent to the decoder to guide utilization of enhanced directional modes. In one implementation a signal is sent from the encoder to inform the decoder whether or not to reconstruct the image based on use of the extended modes, or to use the standard modes. In one implementation a flag referred to herein as "detection" is sent to the decoder to inform it that the directionality of the current block can be determined based on its neighbors. As the enhanced prediction direction detection is conducted at the decoder side, a high directional resolution can be obtained with the present techniques without requiring significant overhead in regard to the need for additional signaling bits.

The invention is amenable to being embodied in a number of ways, including but not limited to the following descriptions.

One embodiment of the invention is an apparatus for video coding using intra prediction, comprising: (a) a computer (or computers) configured for processing video signals associated with a video coding device (e.g., codec); (b) a memory operably coupled to the computer; and (c) programming configured for retention on the memory and executable on the computer for direction prediction during intra prediction within the video coding device with steps comprising, (c)(i) obtaining image gradient vectors for pixels neighboring a current block, (c)(ii) determining an edge direction for each neighboring pixel by obtaining a perpendicular direction to the image gradient vectors, (c)(iii) discarding edge directions which do not cross block boundaries of the current block and whose norm falls below a minimum threshold, (c)(iv) deriving a dominant edge direction in response to defining an objective function as a summation of projections to a candidate direction and computing a suggested direction of each neighboring pixel, and (c)(v) utilizing the dominant edge direction as a direction prediction for use during the intra prediction within the video coding device.

At least one embodiment of the invention comprises programming executable on the computer for obtaining the image gradient vectors for pixels neighboring a current block, in response to applying a derivative operator (e.g., a first-order derivative operator) to pixels neighboring a current block to obtain image gradient vectors. At least one embodiment of the invention comprises programming configured for determining which edge directions do not cross block boundaries of the current block in response to comparing the slopes of the edge directions against minimum and maximum slope thresholds in preparation for the discarding edge directions. At least one embodiment of the invention comprises programming configured for determining the summation of projections in response to objective function $S(\theta)$ as summation of projections to a candidate direction $\theta$, as given by, $$S(\theta) = \sum_{i=1}^{N} \langle \hat{e}, \vec{a}_i \rangle^2 = \sum_{i=1}^{N} |\vec{a}_i|^2 \cos(\theta - \theta_i)^2$$

wherein $\vec{a}_i$ with (i=1, 2, ..., N) represents considered edge vectors, $\hat{e}$ is an arbitrary unit vector with an argument of candidate direction $\theta$, with $\langle\ ,\ \rangle$ denoting an inner product between two vectors and $\theta_i$ denotes direction for each neighbor.

At least one embodiment of the invention comprises programming configured for solving an objective function $S(\theta)$ by performing principle component analysis on considered edge vectors; wherein the principle component analysis yields two eigenvalues $(\lambda_0, \lambda_1)$, and two orthogonal spanning vectors associated to $(\lambda_0, \lambda_1)$, respectively; wherein it is assumed without loss of generality that $\lambda_0$; wherein argument of first spanning vector is utilized as dominant edge direction $\theta^*$; and wherein if values $\lambda_0 < \lambda_1$, then values of $\lambda_0$ and $\lambda_1$ are swapped and the two orthogonal spanning vectors are also swapped. At least one embodiment of the invention comprises programming configured for determining a confidence measure s for the dominant edge direction in response to a relation, $$s = \frac{\lambda_0}{\lambda_0 + \lambda_1},$$

wherein two eigenvalues $(\lambda_0, \lambda_1)$, are obtained from a principal component analysis (PCA), and in which larger s values indicate higher levels of confidence on the derived edge direction.

At least one embodiment of the invention comprises an encoder as the apparatus for video coding. At least one embodiment of the invention comprises programming executable on the computer for performing steps comprising: (a) finding an optimum prediction direction $\theta_{opt}$ which accounts for curvature in the dominant edge direction $\theta^*$; (b) determining direction adjustment angle $\Delta\theta$ in response to the optimum prediction direction $\theta_{opt}$ and the dominant edge direction $\theta^*$ as $\Delta\theta = \theta_{opt} - \theta^*$; (c) quantizing the direction adjustment angle $\Delta\theta$ into a quantized direction adjustment angle; and (d) encoding the quantized direction adjustment angle as side information within an encoded output of the encoder. At least one embodiment of the invention comprises programming executable on the computer for determining a quantization step size in quantizing the direction adjustment angle, wherein the quantization step size is a decreasing function of a confidence value s.

At least one embodiment of the invention comprises a decoder as the video coding apparatus. In at least one embodiment of the invention the decoder is configured to receive an encoded video signal and has programming executable on the computer to perform direction prediction as it was performed in an encoder that generated the encoded video signal. It will be appreciated that the direction prediction of encoder and decoder need not be exactly alike in regards to the exact steps and processing, but are considered alike insofar as the decoder is able to arrive at the same direction prediction as determined by the encoder and thus encoded into the encoded video signal. At least one embodiment of the invention comprises programming executable on the computer of the decoder for receiving a quantized direction adjustment angle, within the encoded video signal, which is utilized in combination with the direction prediction to optimize the direction prediction.

At least one embodiment of the invention comprises programming executable on the computer for obtaining the intra prediction signal for a current block by steps comprising: (a) determining a straight line along the prediction direction of each pixel within the pixels neighboring a current block; (b) finding reconstructed pixels in a pre-defined neighborhood which are sufficiently proximal to the straight line; and (c) computing a prediction of the pixels by using an interpolation of the selected neighbors. At least one embodiment of the invention comprises programming executable on the computer for performing steps comprising: (a) determining that the dominant edge direction can be derived; and (b) setting a mode flag within side information utilized by a decoder, (a) determining that the dominant edge direction can be derived; (b) setting a mode flag within side information utilized by a decoder; and (c) selecting a conventional direction prediction instead of utilizing the dominant edge direction in response to the mode flag not being set.

One embodiment of the invention is an apparatus for video coding using intra prediction, comprising: (a) a computer configured for processing video signals associated with a video coding device; (b) a memory coupled to the computer; and (c) programming configured for retention on the memory and executable on the computer for direction prediction as utilized during intra prediction within the video coding device by steps comprising, (c)(i) obtaining image gradient vectors for pixels neighboring a current block in response to applying a derivative operator (preferably a first-order derivative operator) to pixels neighboring a current block to obtain image gradient vectors, (c)(ii) determining an edge direction for each neighboring pixel by obtaining a perpendicular direction to the image gradient vectors, (c)(iii) determining which edge directions do not cross block boundaries of the current block in response to comparing slopes of the edge directions against minimum and maximum slope thresholds, (c)(iv) discarding edge directions which do not cross block boundaries of the current block and whose norm falls below a minimum threshold, (c)(v) deriving a dominant edge direction in response to defining an objective function as a summation of projections to a candidate direction and computing suggested direction of each neighboring pixel, and (c)(vi) utilizing the dominant edge direction as a direction prediction for use during the intra prediction within the video coding device.

One embodiment of the invention is a method of video coding using intra prediction within a video coding device configured for direction prediction during intra prediction, comprising: (a) obtaining image gradient vectors for pixels neighboring a current block; (b) determining an edge direction for each neighboring pixel by obtaining a perpendicular direction to the image gradient vectors; (c) discarding edge directions which do not cross block boundaries of the current block and whose norm falls below a minimum threshold; (d) deriving a dominant edge direction in response to defining an objective function as a summation of projections to a candidate direction and computing suggested direction of each neighboring pixel; and (e) utilizing the dominant edge direction as a direction prediction for use during the intra prediction within the video coding device.

The present invention provides a number of beneficial elements which can be implemented either separately or in any desired combination without departing from the present teachings.

An element of the invention is an intra predictive video coding method and apparatus which improves coding accuracy.

Another element of the invention is an enhanced edge-based adaptive direction estimation method which improves intra prediction.

Another element of the invention is a method of deriving a best prediction direction using computed edge vectors.

Another element of the invention is enhanced directional prediction which can be applied at the decoder in response to neighboring blocks.

Another element of the invention is the use of enhanced directional prediction for leveraging inter-block geometric dependency at the decoder side.

Another element of the invention is intra prediction with enhanced direction predictions that exceeds the eight directions and DC mode provided by standard AVC coding standards.

Another element of the invention is signaling from the encoder to the decoder whether or not to use extended directional prediction.

Another element of the invention is signaling from the encoder to the decoder that the directionality of the current block can be determined in response to the context of its neighbors.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

1. Video Encoder-Decoder Embodiment.

Figure 1:
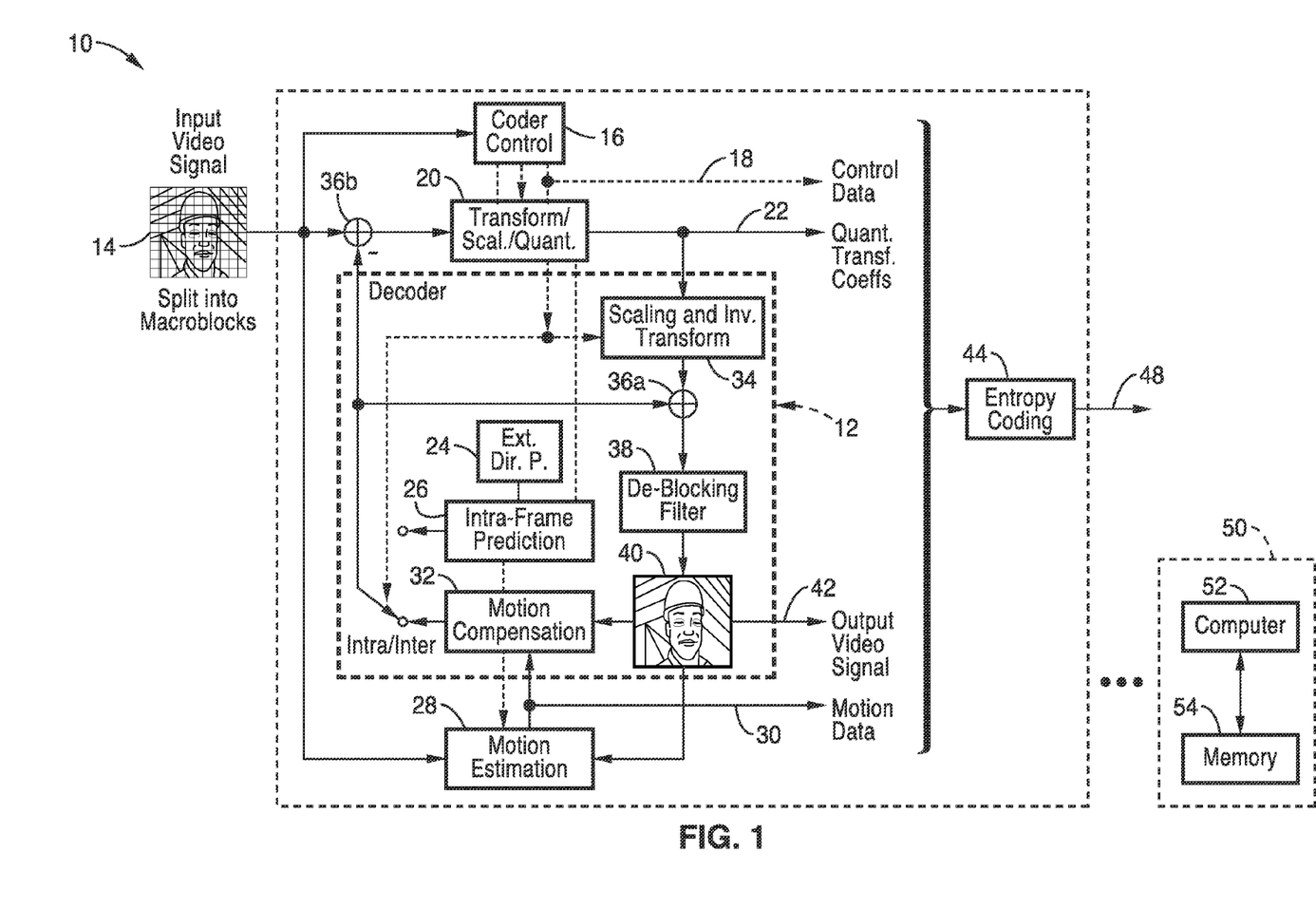
FIG. 1 is a schematic of a video coder according to an embodiment of the present invention shown configured for performing enhanced directional prediction.

FIG. 1 illustrates an example video coding (encoder and/or decoder) embodiment 10 configured for context adaptive intra prediction. Although the present invention is shown implemented within an AVC (H.264) codec, it can be implemented in other intra predictive coding apparatus without departing from the teachings of the present invention. To provide for the prediction of subsequent blocks in the current picture or subsequent coded pictures, a decoder model is present within the encoder itself. Stated another way, it will be appreciated that a decoder is generally a subset of the functional elements of an encoder. The schematic of FIG. 1 depicts both an encoder 10, and a decoder 12, as a subset of encoder 10 for the sake of illustration. It will be appreciated, however, that in practice the decoder can be implemented entirely separately from any encoding functions, or may be implemented in a combination encoder-decoder.

A video input 14 is shown with a frame split into macroblocks (MBs). Coder control logic 16 is seen outputting control data 18. The blocks within the macroblock are predicted from previously encoded neighboring blocks. The difference 36b between video input 14 (the original signal) and the predicted blocks (the residual) is then transform coded with its resultant scaled and quantized in block 20 and quantized transform coefficients output 22.

The decoder section is shown here configured for both inter and intra prediction. In general the decoder performs an inverse of the operations performed by the encoder. It inverts the entropy coding process and then performs the prediction process utilizing motion data and operating in response to the type of selected prediction. Inverse scaling and transforming of the residual is also performed with a deblocking filter applied to the result to arrive at the video output.

Intra prediction exploits spatial redundancy in a video frame, with blocks in an intra predicted MB predicted in response to only the information from already coded MBs in the same frame. Usually intra prediction is performed when temporal prediction is not practical. An extended directional prediction block 24 is shown operating in cooperation with intra-frame prediction 26.

Inter prediction is depicted with motion estimation (ME) block 28 generating motion data 30, and coupled to motion compensation (MC) block 32. An inter prediction residual is shown generated in response to the sum 36a of the residual and the scaling and inverse transform 34 of quantized transform coefficients 22, which is filtered, such as through deblocking filter 38 to arrive at a video 40, with output signal 42. Inter coding utilizes motion compensation techniques for selecting motion data identifying the reference frame and spatial displacement vectors which are applied to predict the blocks of each macroblock.

In the encoder, quantized transform coefficients 22 and control data side information 18 are entropy coded 44 and transmitted as an encoded video signal 48 for storage and/or communication to be decoded at a later time and/or separate location.

The encoder/decoder apparatus is exemplified with a processing means 50, such as comprising at least one processing device (e.g., CPU) 52 and at least one memory 54 for executing programming associated with the encoding and/or decoding. In addition, it will be appreciated that elements of the present invention can be implemented as programming stored on a media, which can be accessed for execution by a CPU for the encoder and/or decoder.

The process of intra prediction exploits spatial redundancy between blocks or samples within a picture. In the AVC video standard both 8×8 and 4×4 block sizes can be adaptively selected. When using the 8×8 block size, intra prediction allows nine (9) prediction modes for luma components. The four 8×8 luma blocks in a 16×16 block can each be predicted using any of the above nine modes; however, prior to utilizing modes 2, 3 and 4, a three tap low pass filter is applied on the reference blocks to prevent visible artifacts which arise in response to the large block size utilized for intra prediction.

Intra prediction can also adaptively select either 4×4 blocks or 8×8 blocks, with nine intracoding modes supported in the AVC standard. An indicator is utilized in the MB header to notify which block size is in use.

2. Edge-Based Adaptive Direction Estimation Method.

In the current AVC intra coding framework, intra prediction is performed to remove the correlation between the pixels in the current block and reconstructed neighbors. The AVC standard defines nine modes including DC prediction and eight directional prediction modes. The prediction mode number is signaled to the decoder using predictive coding. Intra prediction in AVC has two major disadvantages: (1) the eight directional modes do not provide sufficient precision to cover arbitrary directional patterns; and (2) the mode number prediction determined from neighbors is not accurate enough to exploit the geometric dependency between blocks.

The present invention extends AVC based intra prediction to improve the visual quality as well as the coding performance for next generation video codecs. The inventive apparatus and method leverages the inter-block geometric dependency at the decoder side. More specifically, prediction direction detection is performed at the decoder-side, in the reconstructed neighborhood of the current block to get a priori (predetermined) prediction direction which has already been derived at the encoder and is similarly determined at the decoder. The encoder sends side-information to signal the decoder whether to use this new prediction direction or the standard (e.g., AVC based) prediction direction. Since the prediction direction detection is conducted at the decoder side, a high direction resolution can be obtained without requiring additional overhead bits in signaling. New adaptive intra-prediction modes and signaling methods are taught herein for enhancing the coding efficiency as well as the visual quality of AVC intra coding.

Figure 2:
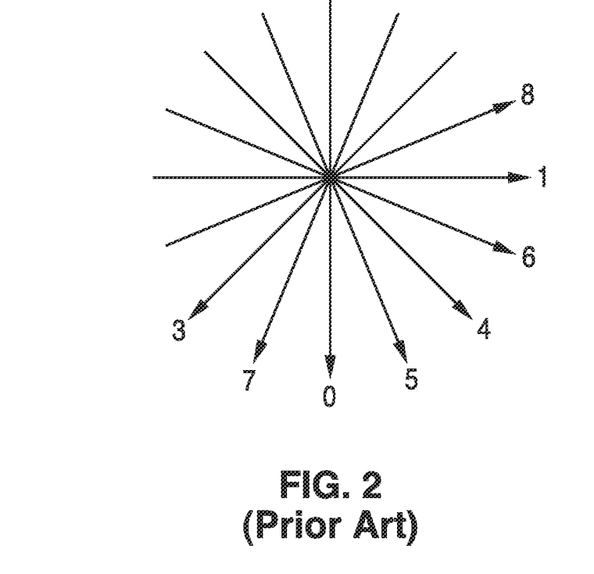
FIG. 2 is a line diagram of the eight prediction mode directions available in the AVC coding standard.

FIG. 2 depicts the DC direction and eight directional prediction modes available in the AVC coding standard. However, limiting the prediction modes to these eight directions results in limiting the accuracy of prediction and reconstructed image quality.

Figure 3:
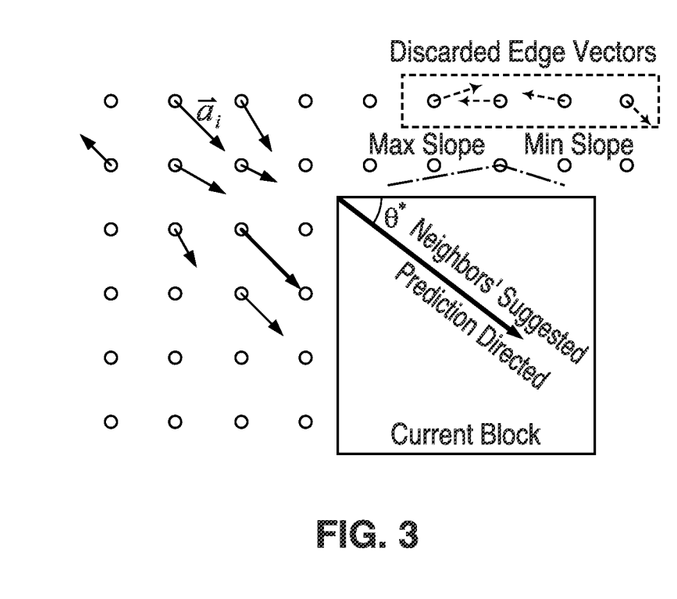
FIG. 3 is a video block representation according to an embodiment of the present invention, showing prediction directions in previously coded neighboring pixels, discarded pixels and directional slope limitations.

FIG. 3 illustrates an embodiment of constructing the new modes and computation of a suggested direction for neighbors θ* relative to the current block, with vectors shown exemplified by $\vec{a}_i$.

As discussed above, additional precision in the prediction direction provides improved prediction and image quality. However, it is important that the bit overhead be controlled for signaling additional directions to the decoder. A tradeoff is required between prediction performance, and the amount of side information to be encoded. The addition of modes increases the amount of side information produced. In this element of the invention, arbitrary direction prediction is supported without significantly increasing side information.

The following discusses deriving a suggested neighbor direction using edge detection. It will be appreciated that edges in natural images are commonly continuous. Multiple prediction directions (modes) are allowed around the suggested direction and adjusted by the encoder to account for curvatures.

The present invention has been developed to take advantage of the available edge information in the reconstructed neighborhood of the block to be coded. To encode an image block, the well-know Sobel operators, $$G_x = \begin{bmatrix} -1 & 0 & 1 \\ -2 & 0 & 2 \\ -1 & 0 & 1 \end{bmatrix}, G_y = \begin{bmatrix} -1 & -2 & -1 \\ 0 & 0 & 0 \\ 1 & 2 & 1 \end{bmatrix}$$

are first applied to (available) neighboring pixels of the block, as illustrated in FIG. 3, to obtain the image gradient vectors. It will be appreciated that the Sobel operator may be replaced by using other derivative operators, preferably other first-order derivative operators, such as comprising a Prewitt operator or a Roberts cross. For each pixel, the edge direction is obtained by taking the perpendicular direction to its gradient vector. After which the edge directions that do not cross the boundary of the block to be coded are discarded as non-relevant edges, as seen in the figure. The decision whether an edge goes across the block can be made by any desired form of programming. In one implementation, this edge decision is efficiently made in response to the use of a lookup table, which contains the minimum and maximum possible slopes for each neighboring pixel as shown in the figure for one location. Moreover, the norms of the gradient vectors are computed and compared to a threshold. Weak gradients are considered as noise and do not contribute to the direction detection.

Figure 4:
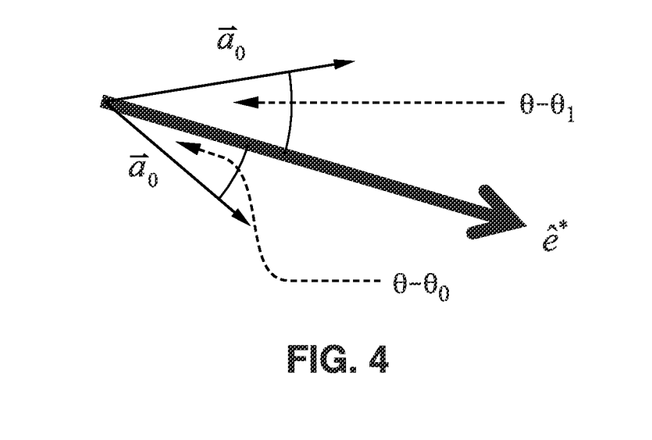
FIG. 4 is a line diagram of angles used in direction prediction in relation to neighboring pixel directions.

FIG. 4 depicts angular representations to which the following discussion and equations refer. A value for a neighbor's suggested direction for neighboring pixels is determined (computed) in response to defining an objective function S(θ) as a summation of projections to a candidate direction θ:

$$S(\theta) = \sum_{i=1}^{N} \langle \hat{e}, \vec{a}_i \rangle^2 = \sum_{i=1}^{N} |\vec{a}_i|^2 \cos(\theta - \theta_i)^2$$

where $\vec{a}_i$ with (i=1, 2, . . . , N) represents considered edge vectors, ê is an arbitrary unit vector with an argument of candidate direction θ, with 〈 , 〉 denoting an inner product between two vectors and $\theta_i$ denotes the direction of each of the neighbors. Determining (computing) suggested direction of neighbors θ*, also referred to as a dominant edge direction, is performed in response to the relation, $$\theta^* = \underset{\theta}{\mathrm{argmax}}\, S(\theta).$$

To solve θ*, a principal component analysis (PCA) is performed on each $\vec{a}_i$. The PCA yields two eigenvalues ($\lambda_0, \lambda_1$), and two orthogonal spanning vectors associated to ($\lambda_0, \lambda_1$), respectively. Without loss of generality, $\lambda_0 \geq \lambda_1$ is assumed. The argument of the first spanning vector is used as θ*. If $\lambda_0 < \lambda_1$, the values of $\lambda_0$ and $\lambda_1$ are swapped and the two spanning vectors are also swapped.

A confidence measure for the suggested edge direction θ* is also determined for future use, such as according to the relation:

$$s = \frac{\lambda_0}{\lambda_0 + \lambda_1}.$$

It should be appreciated that the value of s is preferably in the range $0.5 \leq s \leq 1$, with higher values of s being indicative of higher levels of confidence.

Instead of directly using dominant edge direction θ* as the prediction direction for the current block, θ* is allowed to be adjusted in the present invention by an adjustment angle of Δθ. This adjustment in angle is preferably made in response to the curvature of the edge, as may be determined by any desired mechanism for detecting edge directions. The true (optimum) prediction direction is then given as the dominant edge direction modified by the adjustment angle, and is given by $\theta_{opt} = \theta^* + \Delta\theta$. In one implementation, the amount of direction adjustment Δθ is determined by the encoder and signaled to the decoder as side information.

Since Δθ is a continuous value, it is preferably first quantized into discrete values to facilitate signaling, with a quantization step size of δθ, which is preferably a decreasing function of s. In one embodiment, the confidence value s is compared to a threshold $s_0$, and δθ is then selected from two pre-defined values: if $s < s_0$ then $\delta\theta_1$ is used, otherwise $\delta\theta_2$ is used, with $\delta\theta_2 < \delta\theta_1$.

Direction adjustments are then performed and 2m+1 new modes are introduced based on the confidence measure s, as described below.

Figure 5:
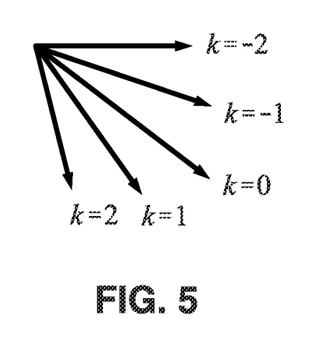
FIG. 5 is a line diagram of direction modes around the suggested neighbor directions.

FIG. 5 depicts a quantization index k which can be defined as $k = [\Delta\theta/\delta\theta]$, wherein [ ] denotes rounding, such as to the nearest integer. Upon receiving a value for k the decoder will utilize $\theta^* + k\delta\theta$ for the directional prediction, wherein θ* is determined by the decoder on its own, and value δθ is predetermined and thus known at the decoder. Therefore, the decoder in response to receiving this small integer value for k can match its extended prediction direction with that determined at the encoder.

In some embodiments k is chosen from a plurality of modes $k \in \{-m, -m+1, \ldots, 0, \ldots, m-1, m\}$, so that 2m+1 new modes are introduced. In at least one preferred embodiment of the new directional prediction modes, a one bit flag is signaled to the decoder to identify whether it should use the new prediction or keep the AVC prediction modes for the current block. In the case of AVC mode, no change has been made in signaling of the modes. Nonetheless, the computation of the most probable mode may be different, because the neighboring blocks may be predicted using one of the new modes.

Figure 6:
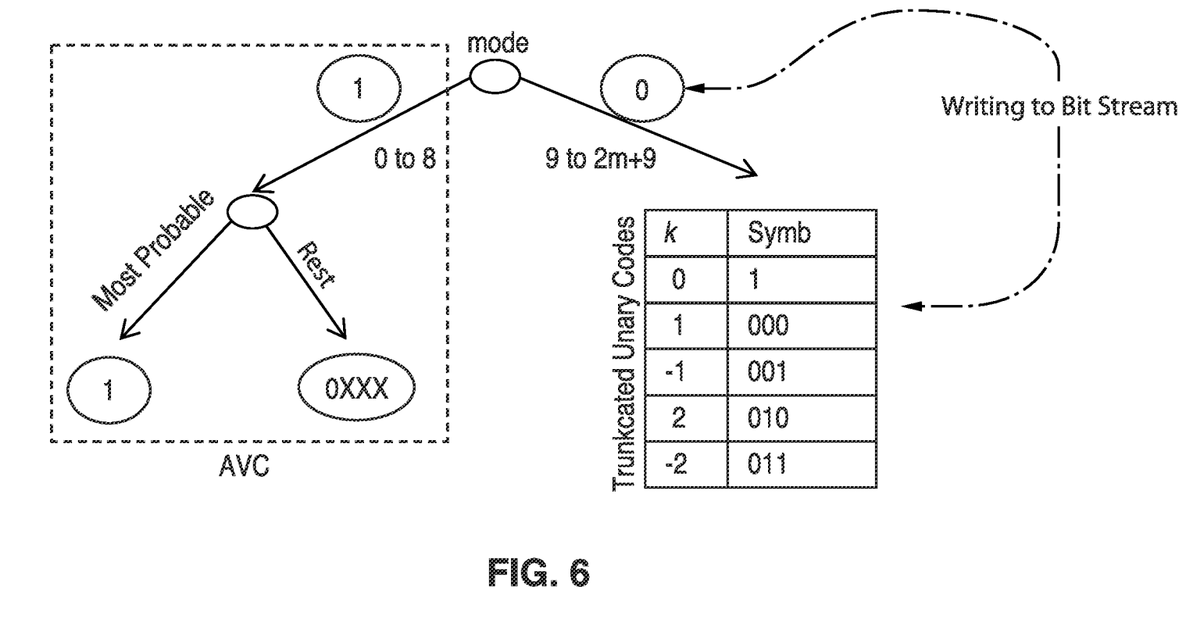
FIG. 6 is a diagram of an encoding tree according to the present invention, showing representation of directional adjustment.

FIG. 6 illustrates encoding of the quantization index k with m=4, exemplified in context-adaptive binary arithmetic coding (CABAC), or other suitable entropy coding techniques, for signaling optimized prediction directions to a decoder. The figure depicts a mode selection bit determining whether to utilize the conventional AVC direction encoding in response to a mode bit=1, or to select extended directions from nine (9) to 2m+9 directions based on determining an optimized prediction direction from relation $\theta^* + k\delta\theta$ with quantization index k being received within the side information.

After the decoder receives the optimum prediction direction $\theta_{opt}$, intra prediction along that direction is performed. The algorithm is described as follows: (1) draw a straight line for each pixel along the prediction direction; (2) find the reconstructed pixels in a pre-defined neighborhood that are close to the line; and (3) compute the prediction of the pixels by using an interpolation of the selected neighbors. Note that both the operation of step (2) and the determination of coefficients for the interpolation filter can be efficiently obtained in response to use of a lookup table.

Since the decoder can derive the dominant edge direction from the reconstructed neighbors, it can obtain the same prediction as the encoder and hence remain in synchronization with how the video data was encoded by the encoder. It will be noted that both the encoder and decoder obtain and/or have values for θ* and δθ. The encoder sends a value for k to the decoder, which is preferably performed in response to the encoder encoding a value for k within the encoded video data. In response to obtaining the value for k, the decoder determines an optimum direction angle by converting k back into an actual angle in response to its angle quantization value, and adding this angle to the dominant edge direction, as represented by $\theta_{opt} = \theta^* + k\delta\theta$. The number of bits needed for sending the value k is variable as described above. It should be appreciated that in general, however, that the more accurate the prediction is for the dominant edge direction (θ*), the fewer bits are required in communicating a quantized direction adjustment angle (k).

Due to its accurate prediction direction estimation and low signaling overhead, the proposed technique significantly improves intra-coding efficiency. In addition, the proposed technique provides decoded images with better subjective quality. The improved subjective quality is generally obtained in the present invention, because the edges tend to produce less visible artifacts due to the improved prediction accuracy, which is especially noticeable when considering low bitrates.

Figure 7:
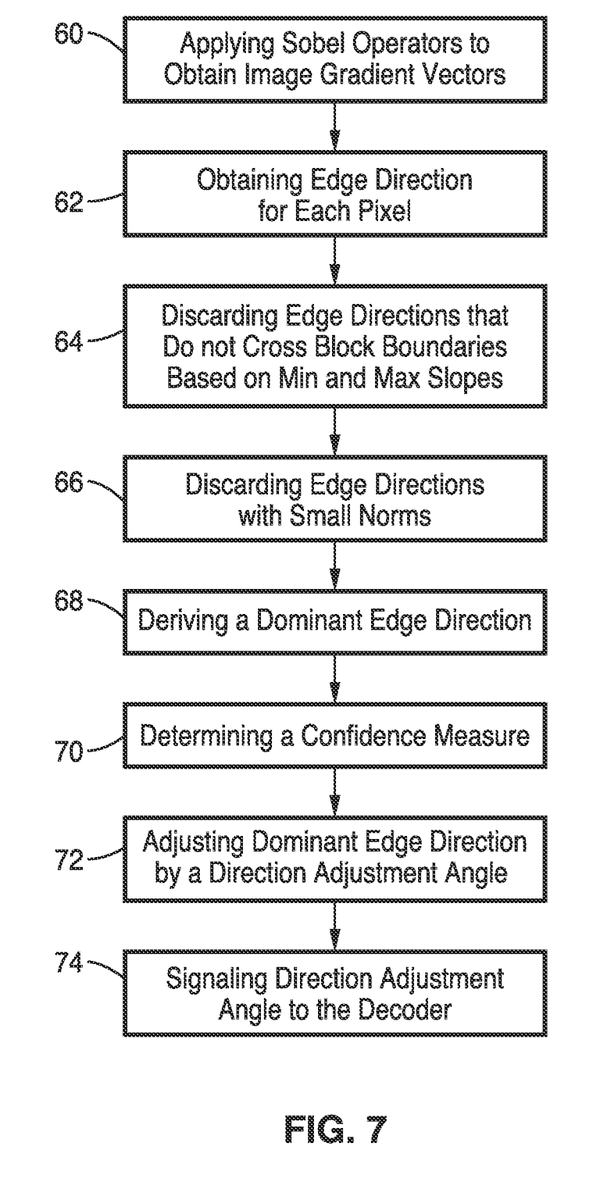
FIG. 7 is a flow diagram of edge-based adaptive direction estimation according to an element of the present invention.

FIG. 7 illustrates an example embodiment of enhanced direction prediction as discussed above, which are determined and communicated to the decoder. A derivative operator, such as exemplified by a Sobel operator, is applied 60 to pixels neighboring a current block to obtain image gradient vectors. It should be appreciated that although the Sobel operator is used as an example of a first-order derivative operator, other forms may be utilized without departing from the teachings of the present invention, such as a Prewitt operator or a Roberts cross.

Sobel edge direction is then obtained 62 for each pixel by taking (computing) the perpendicular direction to its gradient vector. Edge directions are discarded 64 which do not cross block boundaries as based on minimum and maximum slopes for each neighboring pixel, such as determined by a lookup table. Edge directions are also discarded 66, which have small norms (lengths), such as determined in response to failing to reach a minimum threshold condition. A dominant edge direction is then derived 68, such as by defining an objection function as a summation of projections to a candidate direction θ and computing neighbor's suggested direction, which is also referred to as a dominant edge direction. In at least one embodiment of the invention this dominant edge direction can be utilized as the prediction direction, such as in response to a detection mode bit which signals the decoder that the dominant edge direction can be derived and is to be used as the predicted direction. In other embodiments, the dominant edge direction is modified for use as the prediction direction, such as in response to the following steps performed on an encoder. A confidence measure is determined 70, then the dominant edge direction is adjusted 72 based on the confidence measure with 2m+1 new modes introduced. Finally, the direction adjustment angle is signaled 74 to the decoder, such as preferably by quantizing and encoding into the side information of the encoded video. It will be appreciated that steps 60 through 68 would be performed in determining a dominant edge direction in both the encoder and a decoder.

Figure 8:
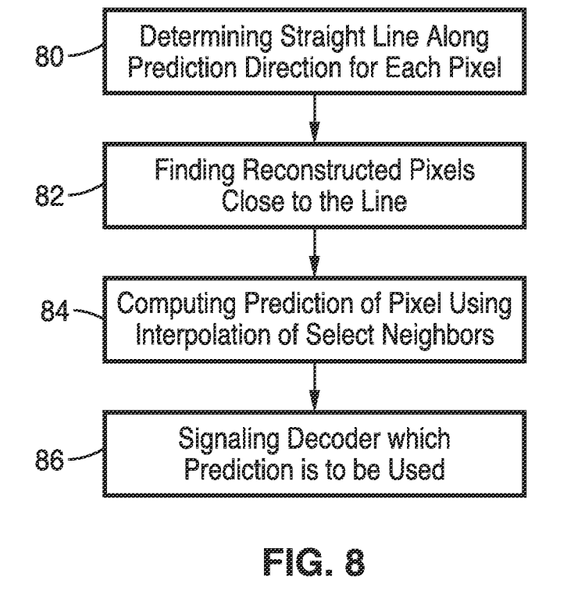
FIG. 8 is a flow diagram of image signal prediction in an arbitrary direction according to an element of the present invention.

FIG. 8 illustrates an example embodiment of image signal prediction. A straight line is determined 80 along the prediction direction for each pixel, and reconstructed pixels are found 82 in a pre-defined neighborhood that are close to the straight line. A prediction of the pixels is computed 84 by interpolation of the selected neighbors, and the prediction information is signaled 86 for use by the decoder, such as encoded in the side information.

From the description herein, it will be further appreciated that the invention can be embodied in various ways, which include but are not limited to the following.

The present invention provides methods and apparatus for enhanced direction prediction for intra prediction coding within encoders and decoders. Inventive teachings can be applied in a variety of apparatus and applications, including video devices which include video encoders and/or decoders.

As can be seen, therefore, the present invention includes the following inventive embodiments among others:

1. An apparatus for video coding using intra prediction, comprising: a computer configured for processing video signals associated with a video coding device; and programming executable on said computer for direction prediction during intra prediction within the video coding device by performing steps comprising obtaining image gradient vectors for pixels neighboring a current block; determining an edge direction for each neighboring pixel by obtaining a perpendicular direction to said image gradient vectors; discarding edge directions which do not cross block boundaries of said current block and whose norm falls below a minimum threshold; deriving a dominant edge direction in response to defining an objective function as a summation of projections to a candidate direction and computing a suggested direction of each neighboring pixel; and utilizing said dominant edge direction as a direction prediction for use during said intra prediction within the video coding device.

2. The apparatus of embodiment 1, further comprising programming executable on said computer for obtaining said image gradient vectors for pixels neighboring a current block, in response to applying a first-order derivative operator to pixels neighboring a current block to obtain image gradient vectors.

3. The apparatus of embodiment 1, further comprising programming executable on said computer for determining which edge directions do not cross block boundaries of said current block in response to comparing the slopes of said edge directions against minimum and maximum slope thresholds in preparation for said discarding edge directions.

4. The apparatus of embodiment 1, further comprising programming executable on said computer for determining said summation of projections in response to objective function S(θ) as summation of projections to a candidate direction θ, as given by, $$S(\theta) = \sum_{i=1}^{N} \langle \hat{e}, \vec{a}_i \rangle^2 = \sum_{i=1}^{N} |\vec{a}_i|^2 \cos(\theta - \theta_i)^2$$

wherein $\vec{a}_i$ with (i=1, 2, ..., N) represents considered edge vectors, a is an arbitrary unit vector with an argument of candidate direction θ, with $\langle , \rangle$ denoting an inner product between two vectors and $\theta_i$ denotes direction for each neighbor.

5. The apparatus of embodiment 1, further comprising programming executable on said computer for solving an objective function S(θ) by performing principle component analysis on considered edge vectors; wherein said principle component analysis yields two eigenvalues ($\lambda_0$, $\lambda_1$), and two orthogonal spanning vectors associated to ($\lambda_0$, $\lambda_1$), respectively; wherein it is assumed without loss of generality that $\lambda_0 \geq \lambda_1$; wherein argument of first spanning vector is utilized as dominant edge direction θ*; and wherein if values $\lambda_0 < \lambda_1$, then values of $\lambda_0$ and $\lambda_1$ are swapped and said two orthogonal spanning vectors are also swapped.

6. The apparatus of embodiment 1, further comprising programming executable on said computer for determining a confidence measure s for the dominant edge direction in response to a relation, $$s = \frac{\lambda_0}{\lambda_0 + \lambda_1}$$

wherein two eigenvalues ($\lambda_0$, $\lambda_1$), are obtained from a principal component analysis (PCA), and in which larger s values indicate higher levels of confidence on deriving said dominant edge direction.

7. The apparatus of embodiment 1, wherein said apparatus for video coding comprises an encoder.

8. The apparatus of embodiment 7, further comprising programming executable on said computer for performing steps comprising: (a) finding an optimum prediction direction $\theta_{opt}$ which accounts for curvature in said dominant edge direction θ*; (b) determining direction adjustment angle Δθ in response to said optimum prediction direction $\theta_{opt}$ and said dominant edge direction θ* as Δθ=$\theta_{opt}$-θ*; (c) quantizing said direction adjustment angle Δθ into a quantized direction adjustment angle; and (d) encoding said quantized direction adjustment angle as side information within an encoded output of said encoder.

9. The apparatus of embodiment 1, further comprising programming executable on said computer for determining a quantization step size in quantizing the direction adjustment angle, wherein the quantization step size is a decreasing function of a confidence value s.

10. The apparatus of embodiment 1, wherein said apparatus for video coding comprises a decoder configured to receive an encoded video signal and programming executable on said computer to perform the same direction prediction as performed in an encoder that generated said encoded video signal.

11. The apparatus of embodiment 10, wherein said programming executable on said computer of said decoder receives a quantized direction adjustment angle within said encoded video signal; wherein said quantized direction adjustment angle is used in combination with said direction prediction to optimize said direction prediction.

12. The apparatus of embodiment 1, further comprising programming executable on said computer for obtaining said intra prediction signal for a current block by steps comprising: (a) determining a straight line along the prediction direction of each pixel within said pixels neighboring the current block; (b) finding reconstructed pixels in a pre-defined neighborhood which are sufficiently proximal to the straight line; and (c) computing a prediction of the reconstructed pixel by using an interpolation of selected neighbors.

13. The apparatus of embodiment 1, further comprising programming executable on said computer for performing steps comprising: (a) determining that said dominant edge direction can be derived; (b) setting a mode flag within side information utilized by a decoder; and (c) selecting a conventional direction prediction instead of utilizing said dominant edge direction in response to said mode flag not being set.

14. An apparatus for video coding using intra prediction, comprising: a computer configured for processing video signals associated with a video coding device; and programming executable on said computer for direction prediction for use during intra prediction within the video coding device by performing steps comprising: obtaining image gradient vectors for pixels neighboring a current block in response to applying a first-order derivative operator to pixels neighboring a current block to obtain image gradient vectors; determining an edge direction for each neighboring pixel by obtaining a perpendicular direction to said image gradient vectors; determining which edge directions do not cross block boundaries of said current block in response to comparing the slopes of said edge directions against minimum and maximum slope thresholds; discarding edge directions which do not cross block boundaries of said current block and whose norm falls below a minimum threshold; deriving a dominant edge direction in response to defining an objective function as a summation of projections to a candidate direction and computing suggested direction of each neighboring pixel; and utilizing said dominant edge direction as a direction prediction for use during said intra prediction within the video coding device.

15. The apparatus of embodiment 1, further comprising programming executable on said computer for determining said summation of projections in response to objective function $S(\theta)$ as summation of projections to a candidate direction $\theta$, as given by, $$S(\theta) = \sum_{i=1}^{N} \langle \hat{e}, \vec{a}_i \rangle^2 = \sum_{i=1}^{N} |\vec{a}_i|^2 \cos(\theta - \theta_i)^2$$

wherein $\vec{a}_i$ with (i=1, 2, ..., N) represents considered edge vectors, a is an arbitrary unit vector with an argument of candidate direction $\theta$, with $\langle , \rangle$ denoting an inner product between two vectors and $\theta_i$ denotes the direction for neighboring pixels.

16. The apparatus of embodiment 15, further comprising programming executable on said computer for solving an objective function $S(\theta)$ by performing principle component analysis on the considered edge vectors; wherein said principle component analysis yields two eigenvalues $(\lambda_0, \lambda_1)$, and two orthogonal spanning vectors associated to $(\lambda_0, \lambda_1)$, respectively; wherein it is assumed without loss of generality that $\lambda_0 \geq \lambda_1$; wherein argument of first spanning vector is utilized as value $\theta^*$; and wherein if values $\lambda_0 < \lambda_1$, then values of $\lambda_0$ and $\lambda_1$ are swapped and said two orthogonal spanning vectors are also swapped.

17. The apparatus of embodiment 14, further comprising programming executable on said computer for determining a confidence measure s for the dominant edge direction in response to a relation, $$s = \frac{\lambda_0}{\lambda_0 + \lambda_1}$$

wherein two eigenvalues $(\lambda_0, \lambda_1)$, are obtained from a principal component analysis (PCA) in which larger s values indicate higher levels of confidence on derivation of said dominant edge direction.

18. The apparatus of embodiment 14, wherein said apparatus for video coding comprises an encoder, and said programming executable on said computer further comprising steps of: (a) finding an optimum prediction direction $\theta_{opt}$ which accounts for curvature in said dominant edge direction $\theta^*$; (b) determining direction adjustment angle $\Delta\theta$ in response to said optimum prediction direction $\theta_{opt}$ and said dominant edge direction $\theta^*$ as $\Delta\theta=\theta_{opt}-\theta^*$; (c) quantizing said direction adjustment angle $\Delta\theta$ into a quantized direction adjustment angle; and (d) encoding said quantized direction adjustment angle as side information within an encoded output of said encoder.

19. The apparatus of embodiment 14, wherein said apparatus for video coding comprises a decoder configured to receive an encoded video signal and programming executable on said computer to perform direction prediction as performed in an encoder that generated said encoded video signal.

20. A method of video coding using intra prediction within a video coding device configured for direction prediction during intra prediction, comprising: (a) obtaining image gradient vectors for pixels neighboring a current block; (b) determining an edge direction for each neighboring pixel by obtaining a perpendicular direction to said image gradient vectors; (c) discarding edge directions which do not cross block boundaries of said current block and whose norm falls below a minimum threshold; (d) deriving a dominant edge direction in response to defining an objective function as a summation of projections to a candidate direction and computing suggested direction of each neighboring pixel; and (e) utilizing said dominant edge direction as a direction prediction for use during said intra prediction within the video coding device.

Embodiments of the present invention may be described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for video coding using intra prediction, comprising:
   (a) a computer configured for processing video signals associated with a video coding device comprising an encoder; and
   (b) programming executable on said computer for direction prediction during intra prediction within the video coding device by performing steps comprising:
      (i) obtaining image gradient vectors for pixels neighboring a current block;
      (ii) determining an edge direction for each neighboring pixel by obtaining a perpendicular direction to said image gradient vectors;
      (iii) discarding edge directions which do not cross block boundaries of said current block and whose norm falls below a minimum threshold;
      (iv) deriving a dominant edge direction in response to defining an objective function as a summation of projections to a candidate direction and computing a suggested direction of each neighboring pixel;
      (v) utilizing said dominant edge direction as a direction prediction for use during said intra prediction within the video coding device;
      (vi) finding an optimum prediction direction $\theta_{opt}$ which accounts for curvature in said dominant edge direction $\theta^*$;
      (vii) determining direction adjustment angle $\Delta\theta$ in response to said optimum prediction direction $\theta_{opt}$ and said dominant edge direction $\theta^*$ as $\Delta\theta = \theta_{opt} - \theta^*$;
      (viii) quantizing said direction adjustment angle $\Delta\theta$ into a quantized direction adjustment angle; and
      (ix) encoding said quantized direction adjustment angle as side information within an encoded output of said encoder.

2. The apparatus recited in claim 1, further comprising programming executable on said computer for obtaining said image gradient vectors for pixels neighboring a current block, in response to applying a first-order derivative operator to pixels neighboring a current block to obtain image gradient vectors.

3. The apparatus recited in claim 1, further comprising programming executable on said computer for determining which edge directions do not cross block boundaries of said current block in response to comparing slopes of said edge directions against minimum and maximum slope thresholds in preparation for said discarding edge directions.

4. The apparatus recited in claim 1, further comprising programming executable on said computer for determining said summation of projections in response to objective function $S(\theta)$ as summation of projections to a candidate direction $\theta$, as given by, $$S(\theta) = \sum_{i=1}^{N} \langle \hat{e}, \vec{a}_i \rangle^2 = \sum_{i=1}^{N} |\vec{a}_i|^2 \cos(\theta - \theta_i)^2$$

wherein $\vec{a}_i$ with (i=1,2,...,N) represents considered edge vectors, $\hat{e}$ is an arbitrary unit vector with an argument of candidate direction $\theta$, with $\langle , \rangle$ denoting an inner product between two vectors and $\theta_i$ denotes direction for each neighboring pixel.

5. The apparatus recited in claim 1:
further comprising programming executable on said computer for solving an objective function $S(\theta)$ by performing principle component analysis on considered edge vectors;
wherein said principle component analysis yields two eigenvalues $(\lambda_0, \lambda_1)$, and two orthogonal spanning vectors associated to $(\lambda_0, \lambda_1)$, respectively;
wherein it is assumed without loss of generality that $\lambda_0 \geq \lambda_1$;
wherein argument of first spanning vector is utilized as dominant edge direction $\theta^*$; and
wherein if values $\lambda_0 < \lambda_1$, then values of $\lambda_0$ and $\lambda_1$ are swapped and said two orthogonal spanning vectors are also swapped.

6. The apparatus recited in claim 1, further comprising programming executable on said computer for determining a confidence measure s for said dominant edge direction in response to a relation, $$s = \frac{\lambda_0}{\lambda_0 + \lambda_1}$$

wherein two eigenvalues ($\lambda_0$, $\lambda_1$), are obtained from a principal component analysis (PCA), and in which larger s values indicate higher levels of confidence on deriving said dominant edge direction.

7. The apparatus recited in claim 1, further comprising programming executable on said computer for determining a quantization step size in quantizing an angle of said edge direction, wherein the quantization step size is a decreasing function of a confidence value s.

8. The apparatus recited in claim 1, wherein said apparatus for video coding comprises a decoder configured to receive an encoded video signal and programming executable on said computer to perform direction prediction as it was performed in an encoder that generated said encoded video signal.

9. The apparatus recited in claim 8:
wherein said programming executable on said computer of said decoder receives a quantized direction adjustment angle within said encoded video signal; and
wherein said quantized direction adjustment angle is utilized in combination with said direction prediction to optimize said direction prediction.

10. The apparatus recited in claim 1, further comprising programming executable on said computer for obtaining said intra prediction signal for a current block by performing steps comprising:
determining a straight line along a prediction direction of each pixel within said pixels neighboring a current block;
finding reconstructed pixels in a pre-defined neighborhood which are sufficiently proximal to the straight line; and
computing a prediction of the reconstructed pixels by using an interpolation of selected neighbors.

11. The apparatus recited in claim 1, further comprising programming executable on said computer for:
determining that said dominant edge direction can be derived;
setting a mode flag within side information utilized by a decoder; and
selecting a conventional direction prediction instead of utilizing said dominant edge direction in response to said mode flag not being set.

12. An apparatus for video coding using intra prediction, comprising:
(a) a computer configured for processing video signals associated with a video coding device; and
(b) programming executable on said computer for direction prediction for use during intra prediction within the video coding device by performing steps comprising:
(i) obtaining image gradient vectors for pixels neighboring a current block in response to applying a first-order derivative operator to pixels neighboring a current block to obtain image gradient vectors;
(ii) determining an edge direction for each neighboring pixel by obtaining a perpendicular direction to said image gradient vectors;
(iii) determining which edge directions do not cross block boundaries of said current block in response to comparing slopes of said edge directions against minimum and maximum slope thresholds;
(iv) discarding edge directions which do not cross block boundaries of said current block and whose norm falls below a minimum threshold;
(v) deriving a dominant edge direction in response to defining an objective function as a summation of projections to a candidate direction and computing suggested direction of each neighboring pixel;
(vi) utilizing said dominant edge direction as a direction prediction for use during said intra prediction within the video coding device; and
(vii) determining said summation of projections in response to objective function S($\theta$) as summation of projections to a candidate direction $\theta$, as given by, $$S(\theta) = \sum_{i=1}^{N} \langle \hat{e}, \vec{a}_i \rangle^2 = \sum_{i=1}^{N} |\vec{a}_i|^2 \cos(\theta - \theta_i)^2$$

wherein $\vec{a}_i$ with (i=1,2, ..., N) represents considered edge vectors, ê is an arbitrary unit vector with an argument of candidate direction $\theta$, with $\langle , \rangle$ denoting an inner product between two vectors and $\theta_i$ denotes direction for each neighboring pixel.

13. The apparatus recited in claim 12:
further comprising programming executable on said computer for solving an objective function S($\theta$) by performing principle component analysis on considered edge vectors;
wherein said principle component analysis yields two eigenvalues ($\lambda_0$, $\lambda_1$), and two orthogonal spanning vectors associated to ($\lambda_0$, $\lambda_1$), respectively;
wherein it is assumed without loss of generality that $\lambda_0 \geq \lambda_1$;
wherein argument of first spanning vector is utilized as value $\theta^*$; and
wherein if values $\lambda_0 < \lambda_1$, then values of $\lambda_0$ and $\lambda_1$ are swapped and said two orthogonal spanning vectors are also swapped.

14. The apparatus recited in claim 12, further comprising programming executable on said computer for determining a confidence measure s for said dominant edge direction in response to a relation, $$s = \frac{\lambda_0}{\lambda_0 + \lambda_1}$$

wherein two eigenvalues ($\lambda_0$, $\lambda_1$), are obtained from a principal component analysis (PCA) in which larger s values indicate higher levels of confidence on derivation of said dominant edge direction.

15. The apparatus recited in claim 12, wherein said apparatus for video coding comprises an encoder, and said programming executable on said computer further comprising steps of:
finding an optimum prediction direction $\theta_{opt}$, which accounts for curvature in said dominant edge direction $\theta^*$;
determining direction adjustment angle $\Delta\theta$ in response to said optimum prediction direction $\theta_{opt}$ and said dominant edge direction $\theta^*$ as $\Delta\theta = \theta_{opt} - \theta^*$;
quantizing said direction adjustment angle $\Delta\theta$ into a quantized direction adjustment angle; and encoding said quantized direction adjustment angle as side information within an encoded output of said encoder.

16. The apparatus recited in claim 12, wherein said apparatus for video coding comprises a decoder configured to receive an encoded video signal and programming executable on said computer to perform direction prediction as performed in an encoder that generated said encoded video signal.

17. An apparatus for video coding using intra prediction, comprising:
   (a) a computer configured for processing video signals associated with a video coding device; and
   (b) programming executable on said computer for direction prediction during intra prediction within the video coding device by performing steps comprising:
      (i) obtaining image gradient vectors for pixels neighboring a current block;
      (ii) determining an edge direction for each neighboring pixel by obtaining a perpendicular direction to said image gradient vectors;
      (iii) discarding edge directions which do not cross block boundaries of said current block and whose norm falls below a minimum threshold;
      (iv) deriving a dominant edge direction in response to defining an objective function as a summation of projections to a candidate direction and computing a suggested direction of each neighboring pixel;
      (v) utilizing said dominant edge direction as a direction prediction for use during said intra prediction within the video coding device; and
      (vi) determining said summation of projections in response to objective function $S(\theta)$ as summation of projections to a candidate direction $\theta$, as given by, $$S(\theta) = \sum_{i=1}^{N} \langle \hat{e}, \vec{a}_i \rangle^2 = \sum_{i=1}^{N} |\vec{a}_i|^2 \cos(\theta - \theta_i)^2$$

wherein $\vec{a}_i$ with (i=1,2, ..., N) represents considered edge vectors, $\hat{e}$ is an arbitrary unit vector with an argument of candidate direction $\theta$, with $\langle , \rangle$ denoting an inner product between two vectors and $\theta_i$ denotes direction for each neighboring pixel.

18. The apparatus recited in claim 17, further comprising programming executable on said computer for obtaining said image gradient vectors for pixels neighboring a current block, in response to applying a first-order derivative operator to pixels neighboring a current block to obtain image gradient vectors.

19. The apparatus recited in claim 17, further comprising programming executable on said computer for determining which edge directions do not cross block boundaries of said current block in response to comparing slopes of said edge directions against minimum and maximum slope thresholds in preparation for said discarding edge directions.

20. The apparatus recited in claim 17, further comprising programming executable on said computer for determining a confidence measure s for said dominant edge direction in response to a relation, $$s = \frac{\lambda_0}{\lambda_0 + \lambda_1}$$

wherein two eigenvalues ($\lambda_0$, $\lambda_1$), are obtained from a principal component analysis (PCA), and in which larger s values indicate higher levels of confidence on deriving said dominant edge direction.

21. The apparatus recited in claim 17, wherein said apparatus for video coding comprises an encoder.

22. The apparatus recited in claim 17, further comprising programming executable on said computer for determining a quantization step size in quantizing an angle of said edge direction, wherein the quantization step size is a decreasing function of a confidence value s.

23. The apparatus recited in claim 17, wherein said apparatus for video coding comprises a decoder configured to receive an encoded video signal and programming executable on said computer to perform direction prediction as it was performed in an encoder that generated said encoded video signal.

24. The apparatus recited in claim 23:
   wherein said programming executable on said computer of said decoder receives a quantized direction adjustment angle within said encoded video signal; and
   wherein said quantized direction adjustment angle is utilized in combination with said direction prediction to optimize said direction prediction.

25. The apparatus recited in claim 17, further comprising programming executable on said computer for obtaining said intra prediction signal for a current block by performing steps comprising:
   determining a straight line along a prediction direction of each pixel within said pixels neighboring a current block;
   finding reconstructed pixels in a pre-defined neighborhood which are sufficiently proximal to the straight line; and
   computing a prediction of the reconstructed pixels by using an interpolation of selected neighbors.

26. The apparatus recited in claim 17, further comprising programming executable on said computer for:
   determining that said dominant edge direction can be derived;
   setting a mode flag within side information utilized by a decoder; and
   selecting a conventional direction prediction instead of utilizing said dominant edge direction in response to said mode flag not being set.

27. An apparatus for video coding using intra prediction, comprising:
   (a) a computer configured for processing video signals associated with a video coding device; and
   (b) programming executable on said computer for direction prediction during intra prediction within the video coding device by performing steps comprising:
      (i) obtaining image gradient vectors for pixels neighboring a current block;
      (ii) determining an edge direction for each neighboring pixel by obtaining a perpendicular direction to said image gradient vectors;
      (iii) discarding edge directions which do not cross block boundaries of said current block and whose norm falls below a minimum threshold;
      (iv) deriving a dominant edge direction in response to defining an objective function as a summation of projections to a candidate direction and computing a suggested direction of each neighboring pixel;
      (v) utilizing said dominant edge direction as a direction prediction for use during said intra prediction within the video coding device; and (vi) solving an objective function S(θ) by performing principle component analysis on considered edge vectors;
(vii) wherein said principle component analysis yields two eigenvalues ($\lambda_0$, $\lambda_1$), and two orthogonal spanning vectors associated to ($\lambda_0$, $\lambda_1$), respectively;
(viii) wherein it is assumed without loss of generality that $\lambda_0 \geq \lambda_1$;
(ix) wherein argument of first spanning vector is utilized as dominant edge direction θ*; and
(x) wherein if values $\lambda_0 < \lambda_1$, then values of $\lambda_0$ and $\lambda_1$ are swapped and said two orthogonal spanning vectors are also swapped.

28. The apparatus recited in claim 27, further comprising programming executable on said computer for obtaining said image gradient vectors for pixels neighboring a current block, in response to applying a first-order derivative operator to pixels neighboring a current block to obtain image gradient vectors.

29. The apparatus recited in claim 27, further comprising programming executable on said computer for determining which edge directions do not cross block boundaries of said current block in response to comparing slopes of said edge directions against minimum and maximum slope thresholds in preparation for said discarding edge directions.

30. The apparatus recited in claim 27, further comprising programming executable on said computer for determining a confidence measure s for said dominant edge direction in response to a relation, $$s = \frac{\lambda_0}{\lambda_0 + \lambda_1}$$

wherein two eigenvalues ($\lambda_0$, $\lambda_1$), are obtained from a principal component analysis (PCA), and in which larger s values indicate higher levels of confidence on deriving said dominant edge direction.

31. The apparatus recited in claim 27, wherein said apparatus for video coding comprises an encoder.

32. The apparatus recited in claim 27, further comprising programming executable on said computer for determining a quantization step size in quantizing an angle of said edge direction, wherein the quantization step size is a decreasing function of a confidence value s.

33. The apparatus recited in claim 27, wherein said apparatus for video coding comprises a decoder configured to receive an encoded video signal and programming executable on said computer to perform direction prediction as it was performed in an encoder that generated said encoded video signal.

34. The apparatus recited in claim 33:
wherein said programming executable on said computer of said decoder receives a quantized direction adjustment angle within said encoded video signal; and
wherein said quantized direction adjustment angle is utilized in combination with said direction prediction to optimize said direction prediction.

35. The apparatus recited in claim 27, further comprising programming executable on said computer for obtaining said intra prediction signal for a current block by performing steps comprising:
determining a straight line along a prediction direction of each pixel within said pixels neighboring a current block;
finding reconstructed pixels in a pre-defined neighborhood which are sufficiently proximal to the straight line; and
computing a prediction of the reconstructed pixels by using an interpolation of selected neighbors.

36. The apparatus recited in claim 27, further comprising programming executable on said computer for:
determining that said dominant edge direction can be derived;
setting a mode flag within side information utilized by a decoder; and
selecting a conventional direction prediction instead of utilizing said dominant edge direction in response to said mode flag not being set.

37. An apparatus for video coding using intra prediction, comprising:
(a) a computer configured for processing video signals associated with a video coding device; and
(b) programming executable on said computer for direction prediction for use during intra prediction within the video coding device by performing steps comprising:
(i) obtaining image gradient vectors for pixels neighboring a current block in response to applying a first-order derivative operator to pixels neighboring a current block to obtain image gradient vectors;
(ii) determining an edge direction for each neighboring pixel by obtaining a perpendicular direction to said image gradient vectors;
(iii) determining which edge directions do not cross block boundaries of said current block in response to comparing slopes of said edge directions against minimum and maximum slope thresholds;
(iv) discarding edge directions which do not cross block boundaries of said current block and whose norm falls below a minimum threshold;
(v) deriving a dominant edge direction in response to defining an objective function as a summation of projections to a candidate direction and computing suggested direction of each neighboring pixel; and
(vi) utilizing said dominant edge direction as a direction prediction for use during said intra prediction within the video coding device;
(vii) finding an optimum prediction direction $\theta_{opt}$, which accounts for curvature in said dominant edge direction θ*;
(viii) determining direction adjustment angle Δθ in response to said optimum prediction direction $\theta_{opt}$ and said dominant edge direction θ* as $\Delta\theta = \theta_{opt} - \theta^*$;
(ix) quantizing said direction adjustment angle Δθ into a quantized direction adjustment angle; and
(x) encoding said quantized direction adjustment angle as side information within an encoded output of said encoder.

* * * * *